United States Patent [19]

Ballard

[11] Patent Number: 4,459,115
[45] Date of Patent: Jul. 10, 1984

[54] OUTBOARD MOTOR VERTICAL TRIM INDICATOR

[75] Inventor: Elmer I. Ballard, Council Bluffs, Iowa

[73] Assignee: LeBron Manufacturing Company, Inc., Omaha, Nebr.

[21] Appl. No.: 358,447

[22] Filed: Mar. 15, 1982

[51] Int. Cl.³ .............................................. B63H 5/12
[52] U.S. Cl. ......................................... 440/2; 440/53; 340/689
[58] Field of Search ...................... 440/2, 53; 114/121, 114/122; 340/689; 200/61.48, 61.52, 277, 61.53, 61.45 R, 61.47, DIG. 29

[56] References Cited

U.S. PATENT DOCUMENTS

| | | | |
|---|---|---|---|
| 2,208,426 | 7/1940 | Livingston | 200/DIG. 29 |
| 3,497,808 | 2/1970 | Goodman et al. | 200/61.45 R |
| 3,831,163 | 8/1974 | Byers | 200/61.45 R |
| 3,894,250 | 7/1975 | Hager et al. | 440/53 |

Primary Examiner—Trygve M. Blix
Assistant Examiner—Ivy M. Shum
Attorney, Agent, or Firm—Glenn K. Robbins

[57] ABSTRACT

A trim indicator for outboard motors or the like for determining the tilt or angularity of the propeller with respect to a parallel position to the water level. The indicator is attached to the motor to align a vertical sensing member perpendicular to the axis of the propeller. When the motor is tilted, e.g. as the boat comes up to planing speed the sensing member indicates the angular degree of tilt by means of an electrical circuit to a signal receiver suitably located in the operating control panel in order that appropriate trimming measures may be taken. The indicator may be attached to the motor shroud or cover in the form of a signal sending housing. The sensing member may be in the form of an electrically conductive ball which seeks by gravity the lowest point on an arcuate track having a series of spaced electrical contacts. As the motor tilts the ball touches a contact corresponding to the angle of tilt to complete a circuit to the receiver to light a signal light to indicate visually the angle of tilt or the plumb or vertical position of the motor where the propeller is parallel to the surface of the water. To minimize effects or turbulence or chattering of the ball an arcuate cover for the track is provided closely spaced above the ball. A non-conductive dampening fluid may also be employed to slow the movement of the ball to minimize chattering tendencies.

13 Claims, 16 Drawing Figures

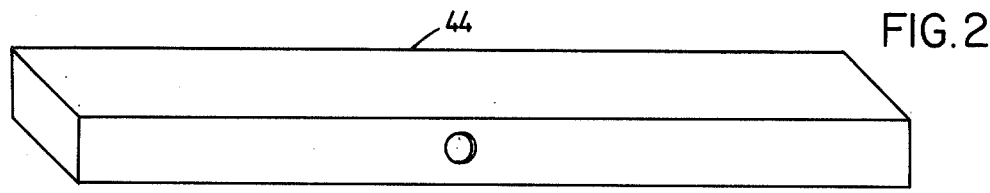
FIG. 2
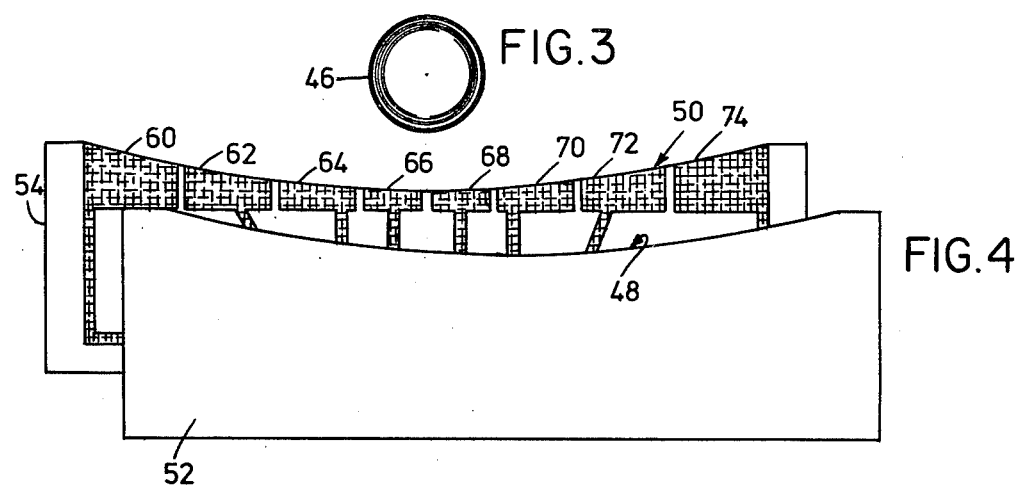
FIG. 3
FIG. 4
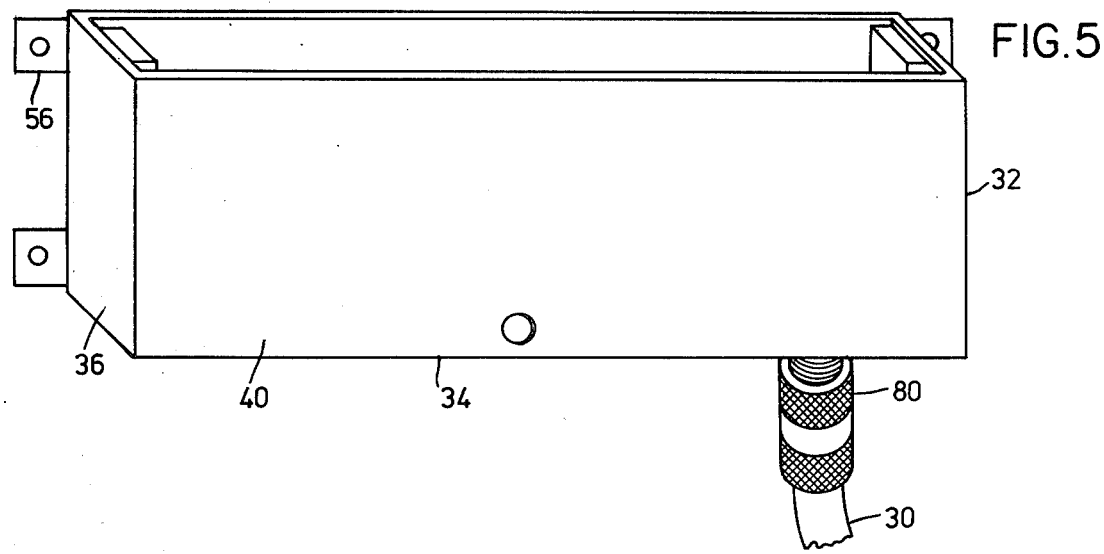
FIG. 5

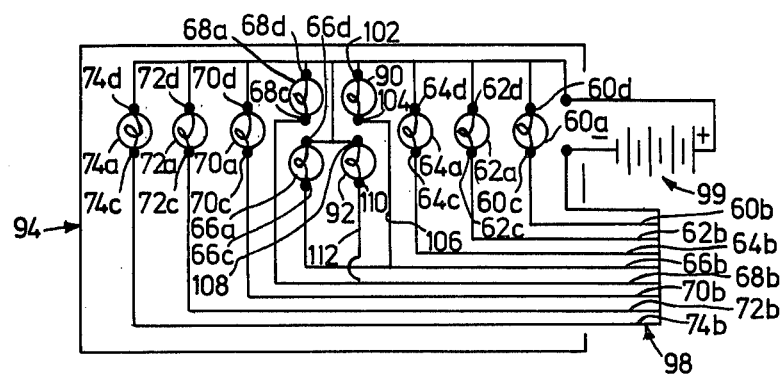
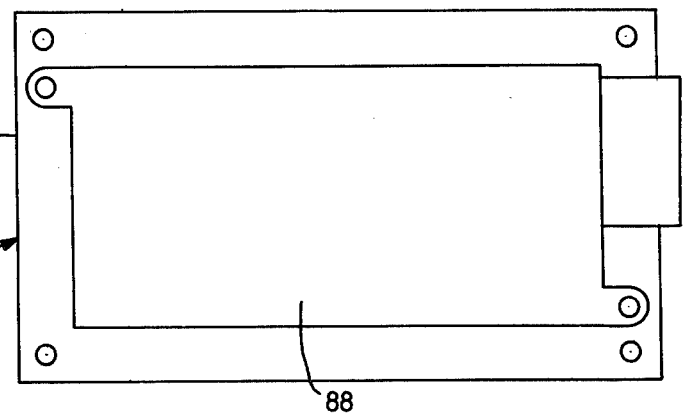
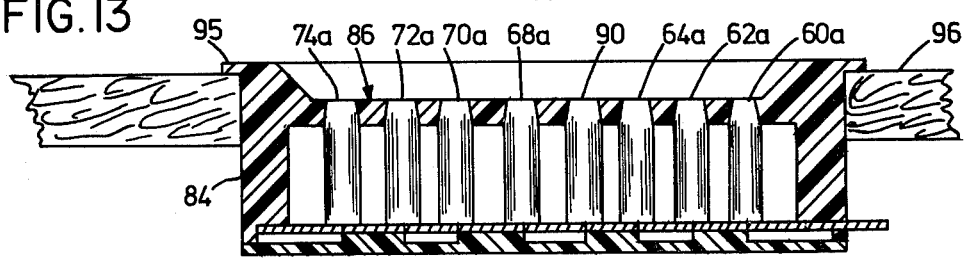
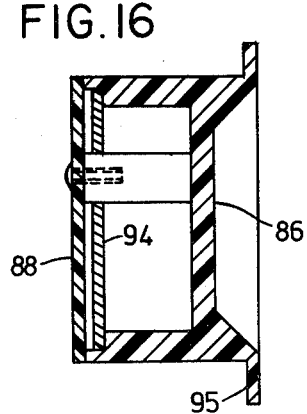
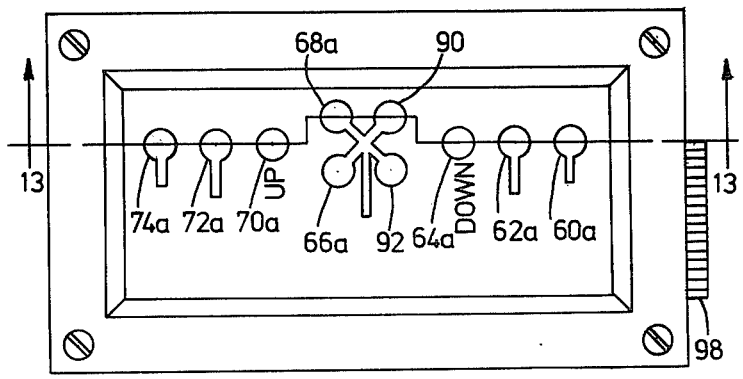

OUTBOARD MOTOR VERTICAL TRIM INDICATOR

BACKGROUND OF THE INVENTION

In the past various devices have been employed with outboard and outboard-inboard motor boats providing socalled power trim units for the boat to vary the planing attitude of the boat and motor tilt devices to vary the tilt of the motor with respect to the boat transom. Such devices have included trim gauges of one type or another to indicate the degree of tilt of the outboard portion of the motor with respect to the transom. Such indicators may also indicate the distance that the motor is moved away from the transom which is simply another form of tilt indication with respect to the transom.

Such devices do not indicate the relative position of the outboard motor with respect to the water and give no accurate indication of whether the axis of the propeller is parallel to the line of travel of the boat or in other words whether it is parallel to the surface of the water. In such parallel condition the motor should be perpendicular to the surface of the water or line of travel of the boat.

It has long been a problem to present the maximum propulsion force in such boats both for economy purposes and high speed performances. Such problems are well typified by an upward direction of thrust of the propeller causing the well-known "rooster-tail" with a consequent loss of energy and fuel and a downward thrust causing a bow-heavy boat.

SUMMARY OF THE INVENTION

By means of this invention there has been provided a vertical trim indicator that when attached to the outboard motor will by sensing means indicate to the operator the angular position of the driveshaft when perpendicular to the surface of the water or the degree of angular tilt away from the vertical position. By adjustment of the motor or trim of the boat the driveshaft of the motor may be brought to the vertical position where the axis of the propeller shaft is in the line with the direction of travel of the boat and parallel to the surface of the water for maximum thrust and efficiency.

The device is comprised of a vertical trim indicator containing a vertical sensing member which is supported within a signal sender housing adapted to be attached to the outboard motor. The sending unit senses the vertical position of the motor or the angular degree of tilt and by an electrical circuit connected to a remotely positioned receiving unit sends appropriate signals to the receiver to indicate the position of the motor as in a proper vertical position or in an angularly tilted position to be corrected. By positioning the receiver in an operating or instrument console in the boat the operator may determine the position of the motor and take any necessary action to adjust a conventional boat hull trim device or reposition the motor tilt position with respect to the boat transom.

The vertical trim indicator sending portion of the invention is comprised of a housing which is directly attached to the shroud or cover of the outboard motor. When speaking of outboard motors it will also be understood that inboard-outboard motors may also be included where the outboard portion of the motor has a propeller which may be tilted or pivoted about a horizontal axis which is conventional for such motors.

The sender housing contains a vertical position sensing member which senses any movement of the motor when it is moved away or tilted from the vertical position where the driveshaft of the outboard motor is positioned in a vertical or plumb position with respect to the water. In such position the axis of the propeller is parallel to the surface of the water and direction of travel of the boat which is desired for maximum thrust and efficiency.

The vertical sensing member is adapted to energize separate electrical circuits to indicate separately the vertical position and different angular positions as the motor is tilted. The energizing of the separate electrical circuits through a cable connected between the sender housing and the remotely positioned receiving unit signals separate degree of tilt signal lights in the receiving unit to inform the operator of the position of the motor.

In a preferred form the sender unit is comprised of a pair of upwardly dished or concave tracks within the housing. One track contains a plurality of spaced electrical contacts located at different angular positions on either side of a zero degree of tilt position at the bottom or middle portion of the track corresponding to the vertical position of the motor.

The second track provides a continuous ground contact. An electrically conductive ball rides on top of the track and contacts the various separate contacts as the sender housing and motor are tilted. Due to the arcuate concave configuration of the track upon which the ball rides, the ball always seeks by gravity the lowest position of the track. The closing of the separate circuits as the ball moves energizes the different signal circuits and visual light means in the receiving unit to indicate the position of the motor.

In order to minimize chattering and the influence of vibration on the sensing member of the unit an arcuate limit means, such as a rib or the like is closely spaced above the top of the ball. Further dampening or slowing of movement of the ball may be provided by immersing the track and ball in an electrically non-conductive fluid such as glycerine.

The vertical trim indicator is simple and rugged in construction and may be easily installed on outboard motors. It may be used with conventional trim indicators to indicate the position of the motor with respect to the hull and trim devices to alter the trim or attitude of the hull as desired.

The above features are objects of this invention. Further objects will appear in the detailed description which follows and will be otherwise apparent to those skilled in the art.

For the purpose of illustration of this invention a preferred embodiment is shown in the accompanying drawing. It is to be understood that this is for the purpose of example only and that the invention is not limited thereto.

IN THE DRAWING

FIG. 2 is a pictorial view of the top of the level indicator;

FIG. 3 is a pictorial view of the conductive ball;

FIG. 4 is a pictorial view of the two tracks of the level indicator housing;

FIG. 5 is a pictorial view of the level indicator housing with the top removed;

FIG. 12 is a top plan view of the receiver;

FIG. 13 is a view in section taken on line 13—13 of FIG. 12;

FIG. 14 is a bottom plan view of the receiver;

FIG. 15 is a plan view of the printed circuit board used in the receiver; and

FIG. 16 is a view in end elevation of the receiver with an end plate removed.

DESCRIPTION OF THE INVENTION

Figure 1:
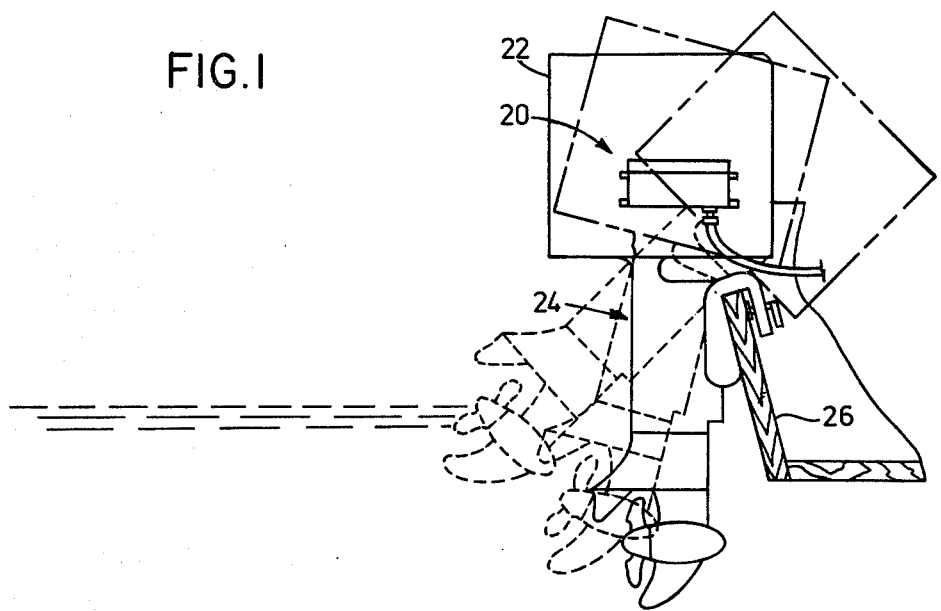
FIG. 1 is a view in side elevation of an outboard motor equipped with the level indicator and showing connection to the transom of a boat in cross-section.

The signal sending portion of the vertical trim indicator of this invention is generally indicated by the reference numeral 20 in FIG. 1 where it is shown connected to the shroud or housing 22 of a conventional outboard motor 24. The outboard motor is connected to the transom 26 of a boat and is provided with conventional means for tilting the motor (not shown) with respect to the boat transom which forms no part of this invention.

Figure 11:
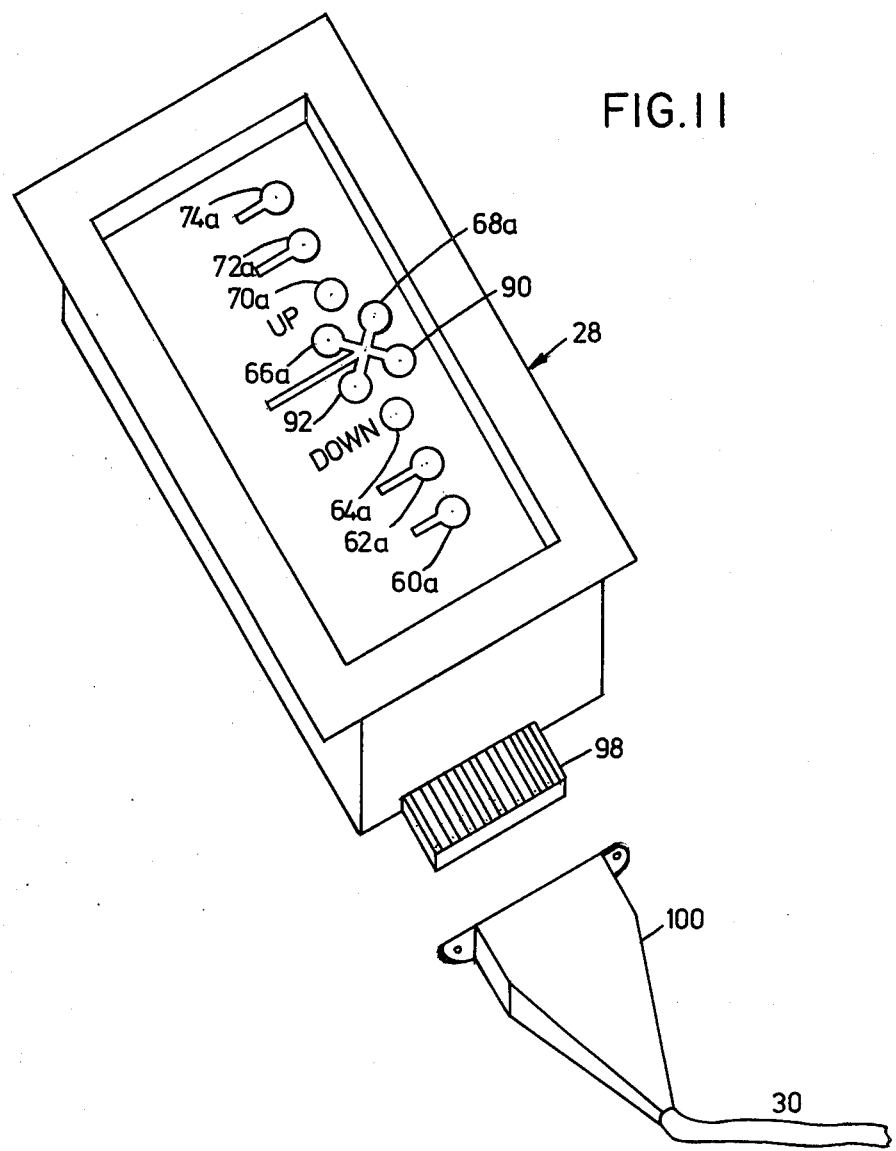
FIG. 11 is a pictorial view of the receiver of the level indicator.

The sending portion of the vertical trim indicator is electrically connected to a signal receiving portion generally indicated by the reference numeral 28 in FIG. 11. A multi-lead electrical cable 30 provides this connection in order that the receiving portion or receiver may be remotely located at a convenient area of the boat such as in instrument console.

The signal sending portion of the vertical trim indicator 20, which may be termed the sender, is more particularly shown in FIGS. 2 through 10. It is comprised of a housing 32 having a bottom wall 34, end walls 36 and 38, side walls 40 and 42 and a cover 44 to provide a hollow sealed boxlike housing. The cover is provided with an arcuate rib 45. All the walls may be constructed of a rigid clear electrically non-conductive plastic such as Lucite, Plexi-glass or the like as will be well understood in the art.

Vertical sensing means are provided by a electrically conductive ball or sphere 46 which may be of steel or other electrically conductive material. The conductive ball rides on a pair of upwardly dished or concave track members 48 and 50. The track members are comprised of plastic plates 52 and 54 of the same electrical insulating or non-conductive properties as similarly described. The track members are spaced apart a distance slightly less than the diameter of the sensing ball in order that the ball may ride on the top edges of the plastic plates which form the afore-mentioned track members with a minimum of friction and maximum stability.

By the afore-mentioned construction the housing may be connected by bolts or the like through flanges 56 on the housing and as the motor tilts the ball will ride freely on the arcuate track members always seeking by gravity the lowest portion of the track. In this fashion the ball and arcuate track provide a vertical sensing means and the relative position of the ball on the track is utilized to indicate the degree of the tilt when the motor is out of plumb or tilted from the vertical position to the tilted positions shown in the dotted lines of FIG. 1.

In order to provide a signal system to indicate the degree of tilt a series of separate spaced electrical contacts 60, 62, 64, 66, 68, 70, 72 and 74 are provided on the track member 50 while a continuous ground 76 is provided on the track member 48. The contacts 66 and 68 both correspond to a substantially 0° of tilt to a slight degree on either side of the vertical and when contacted simultaneously signify the vertical position or tilt of 0°. The spacing of the contacts from each other is such that adjacent contacts are bridged by the conductive ball to signal a degree of tilt between the contacts and provide a more detailed tilt indication as will more fully appear.

Contacts 70, 72 and 74 are spaced apart a sufficient distance on their centers to provide a range of tilt of 5°, 10° and 15° respectively when the motor is tilted upwardly. When the conductive ball bridges contacts 68 and 70 a tilt of $2\frac{1}{2}°$ is indicated, while the bridging of contacts 70 and 72 indicates $7\frac{1}{2}°$ and the bridging of contacts 72 and 74 indicates $12\frac{1}{2}°$.

The contacts 60, 62, 64, and 66 are on the opposite side of the arc and conversely to the afore-mentioned description when contacted indicate a downward tilt of the motor but operate otherwise in a similar manner to the other contacts. Thus, contacts 64, 62 and 60 indicate a tilt of 5°, 10° and 15°, respectively. When the conductive ball bridges contact 64 and 66 a downward tilt of $2\frac{1}{2}°$ is indicated, while the bridging of contacts 62 and 64 indicate $7\frac{1}{2}°$ and the bridging of contacts 60 and 62 indicate $12\frac{1}{2}°$.

Each of the contacts has a separate lead running through a cable connected 80 connected through the cable 30 to a separate signal light in the receiver 28 as will be described. Likewise, the continuous ground 76 is connected by a lead through the cable to a ground connection in the receiver.

The receiver 28 is best shown in FIGS. 11 through 16. It is comprised of a plastic housing 84 having a top viewing surface 86 and is closed by a bottom cover plate 88. The top surface has a plurality of openings as best shown in FIGS. 12 and 13 receiving conventional signal lights. Each of the lights has two contacts (not shown) which are adapted to contact appropriate contacts on a printed circuit board 94.

The housing of the receiver is further provided with flanges 95 at the top whereby the unit be simply attached to a support 96 of a conventional instrument console or the like.

The printed circuit board is more particularly shown in FIG. 15. As there shown it has a plug in tab 98 adapted to receive a socket 100 at the end of cable 30 to provide a quick connect-disconnect connection leading to the sender unit or signal transmitter 20 mounted on the motor.

The printed circuit tab is provided with a plurality of circuit leads 60b, 62b, 64b, 66b, 68b, 70b, 72b, and 74b which are adapted to contact the cable leads communicating with the sender unit contacts 62, 64, 66, 68, 70, 72, and 74 respectively. Similarly the tab has a lead 76b adapted to contact the cable ground lead communicating with the ground contact 76 of the sender unit. A 12 v. battery source 99 provides energy for the circuit.

Each of the afore-mentioned leads 60b, 62b, 64b, 66b, 68b, 70b, 72b and 74b is connected to a corresponding contact in contact with one of the signal lamp contacts.

These contacts are designated 60c, 62c, 64c, 66c, 68c, 70c, 72c and 74c respectively. The ground lead is provided with multiple contacts 60d, 62d, 64d, 66d, 68d, 70d, 72d and 74d opposite the respective contacts previously described and underneath the second contact of the respective signal lamps. Signal lamps 90 and 92 connected in parallel to lamp 90 is energized by ground contact 102 and contact 104 connected to lead 66b by lead 106. Lamp 92 is energized by ground contact 108 and contact 110 connected by lead 112 to lead 68b. Since lamps 66 and 90 and lamps 68 and 92 are in parallel when the boat is under way, with normal vibration the conductive ball will oscillate between the contacts 66 and 68 in the sender and energize all the lamps. The lighting of the four lamps will give an illusion of rotating in a circle and serve to emphasize the correct trim.

OPERATION

The vertical trim indicator of this invention is very simply installed. The sender unit 20 is easily connected to the outboard motor shroud or other accessible portion screwing the flanges 56 of the housing to the motor and ensuring that the housing is aligned with the vertical axis of the drive shaft. In this alignment the conductive ball 46 will be centered in the bottom-most position of the track between contacts 66 and 68 and the propeller of the motor which is at perpendicular to the drive shaft will be aligned with its axis parallel to the surface of the water and in line with the direction of travel of the boat.

The receiving unit 28 is installed in the instrument panel or operating console of the boat by appropriate screws fitting through the flanges 95 of the housing to an appropriate support 96. The cable 30 and battery source are then connected to the receiver unit by connecting the cable socket 100 to the printed circuit tab 98 of the receiver unit. The vertical trim indicator is then ready for operation.

The housing 32 is sealed and may be filled with an electrically non-conductive fluid such as glycerine. The fluid serves as a dampening means to slow the movement of the ball. The viscosity or thickness of the dampening fluid may be controlled to counteract turbulent or vibration forces acting on the motor to minimize variations in the magnitude of such vibration.

In use the motor in vertical position will show a signal indication in the receiver corresponding to the true zero position. In this position the conductive ball will bridge the contacts 66 and 68 on the arcuate track in the sender unit 20 completing a circuit to both signal lamps 66a and 68a. Signal lamps 90 and 92 which are strapped in parallel to lamps 66a and 68a, respectively provide additional visual signal and are employed for greater visibility and attention.

Since the boat and motor are subjected to vibration due to the various influences of turbulence caused by movement through the water and wave movement the conductive ball tends to move back and forth across the space on the arcuate track between the contacts 66 and 68 which will cause intermittent lighting or flashing of the afore-mentioned lamps. Lamp 68a is energized alone to indicate the motor is slightly tilted on the high side of 0° up to 2½° when the ball moves out of contact with 66 and into contact with 68 and similarly lamp 66a is energized alone when the opposite movement of the ball occurs when it contacts only contact 66.

Figure 6:
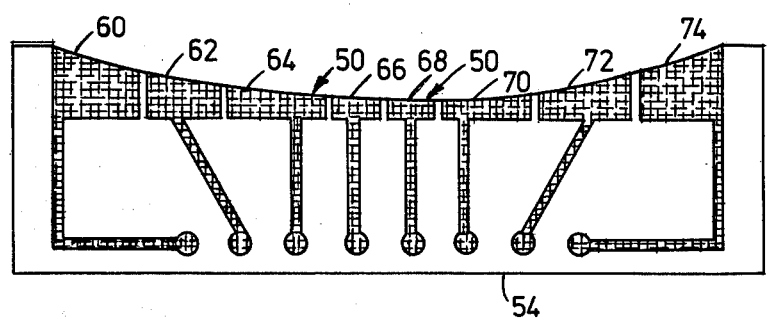
FIG. 6 is a plan view of the inside of the separate contact printed circuit of the side of the housing.
Figure 7:
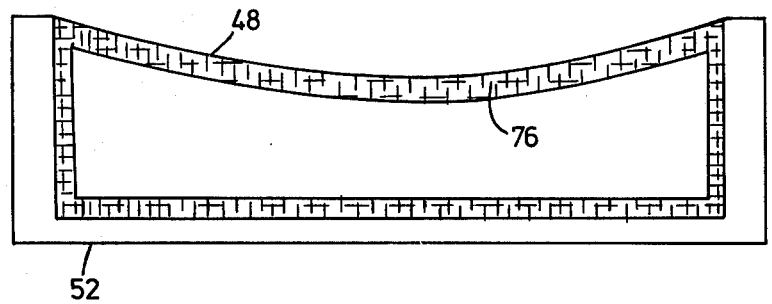
FIG. 7 is a plan view of the inside of the continuous ground on the opposite side of the housing.
Figure 8:
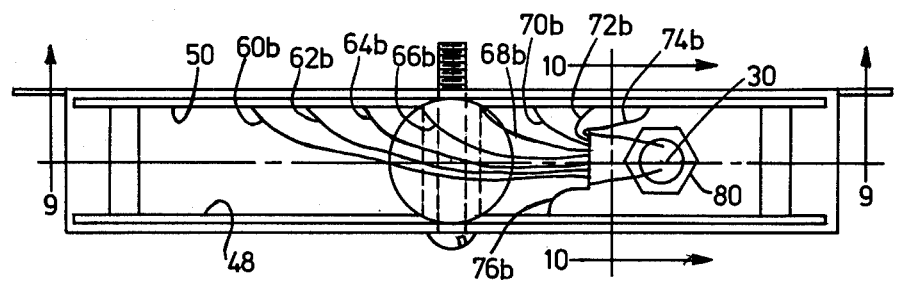
FIG. 8 is a top plan view of the housing with the top removed.
Figure 9:
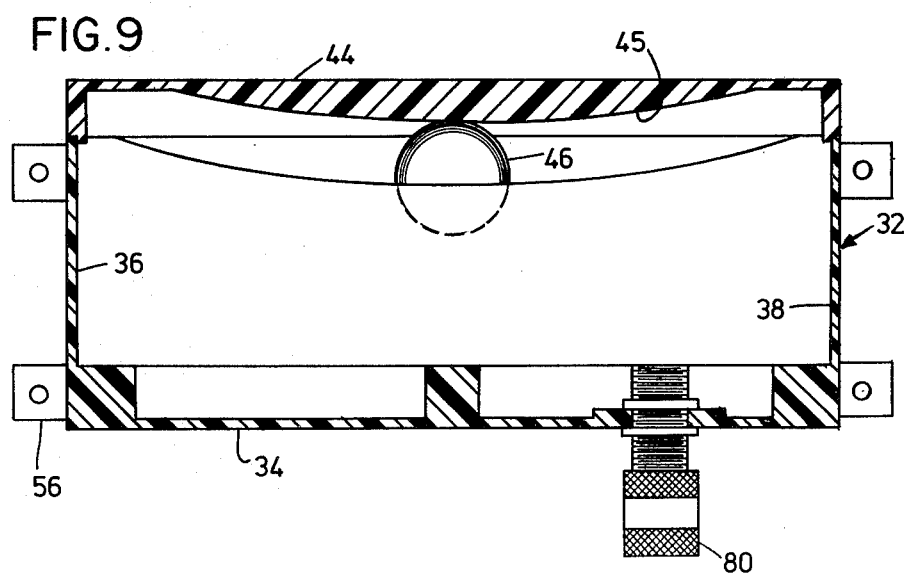
FIG. 9 is a view in section taken on line 9—9 of FIG. 8.
Figure 10:
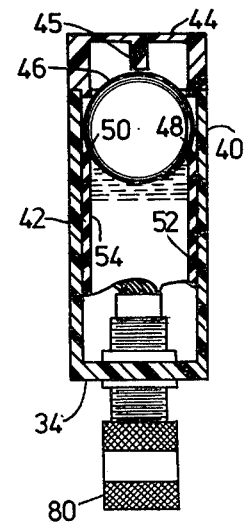
FIG. 10 is a view in section taken on line 10—10 of FIG. 8 with the top cover added.

As the motor is tilted in a further upward degree which as viewed in FIGS. 1 and 6 would provide a clockwise degree of tilt contacts 70, 72 and 74 are contacted which energize UP signal lamps 70a, 72a and 74a, respectively to indicate a 5°, 10° and 15° upward tilt. When contacts 68 and 70 are bridged both lamps 68a and 70a are energized to indicate a 2½° tilt. In similar fashion the bridging of contacts 70 and 72 energizes lamps 70a and 72a to indicate a 7½° tilt and the bridging of contacts 72 and 74 energizes lamps 72a and 74a to indicate a 12½° tilt.

The degree of tilt in the downward degree of tilt is indicated in a similar fashion as that above described but in the opposite portion of the track when the motor moves counterclockwise. Thus, contact 64 when contacted by the ball 46 energizes lamp 64a to indicate a 5° downward tilt, contact 62 energizes lamp 62a indicating a 10° downward tilt and contact 60 energizes contact 60a to indicate a 15° tilt. The bridging by the ball of contacts 66 and 64 energizing lamps 66a and 64a indicates a 2½° tilt and in like manner the bridging of contacts 62 and 64 energizes lamps 62a and 64a to indicate a 7½° tilt and bridging of conctacts 60 and 62 energizes contacts 60a and 62a to indicate a 12½° tilt.

From the above description it can be seen that the degree of tilt of the motor may be readily observed by the boat operator to determine the relative position of the motor and propeller with respect to the water surface. This information enables the operator to take immediately any corrective action necessary to ensure that the axis of the propeller is parallel to the surface of the water and in line with the direction of travel of the boat. This may be effected in conventional fashion by adjusting the degree of tilt of the motor with respect to the boat transom or hull or by varying conventional trim devices employed on the hull or both as will be readily apparent to those skilled in the art.

As previously described in order for a boat motor to operate in the most efficient position on the transom of a boat, the motor should be in or near a vertical (drive shaft vertical) position in relation to the surface of the water once the boat has come out of the "hole" and been put on plane. When the motor is in a vertical position then the prop shaft will be parallel with the surface of the water which is important for maximum efficiency and is readily obtainable by this invention.

If the propeller blades are exactly perpendicular and the axis parallel to the surface of the water there will be zero steering torque. At this time the thrust of the propeller will be in exactly the opposite direction of the line of travel of the boat itself. Thrust will be neither right nor left, up or down and no waste energy propelling the boat as far and the position of the propeller running in the water goes.

When a boat has conventional power trim and tilt on the motor and a conventional trim gauge is employed on the console the gauge tells one thing and that is the position of the motor in relation to the boat. This information is useful when the motor is "tucked in" for coming out of the "hole" and useful to know that the motor is tilted so that motor skeg doesn't drag when the boat is trailered. As far as operating the boat it is not reliable as each time the boat is loaded the weight and balance distribution can change therefore changing the position of the motor for maximum efficiency.

With the vertical trim indicator of this invention the boat can be operated at maximum efficiency through all the planing speeds. For maximum fuel efficiency the operator comes out of the "hole", gets the boat on plane and then trims the motor until the propeller is perpendicular and the axis is parallel with the surface of the water. This is maximum efficiency and of course the most fuel saving speed of the boat and motor.

Various changes and modifications may be made in this invention as will be readily apparent to those skilled in the art. Such changes and modifications are within the scope and teaching of this invention as defined by the claims appended hereto.

What is claimed is:

1. In a boat having an outboard motor propeller the improvement comprising a trim indicator to indicate the tilt angularity of the motor propeller with respect to the vertical as an aid in maintaining the axis of the propeller parallel to the surface of the water and perpendicular to the vertical, said indicator comprising means for mounting the indicator or motor in a fixed position with respect to the propeller to provide for a corresponding tilting movement of the indicator as the propeller is tilted, said indicator comprising a tilt indicator sending housing supporting a plurality of fixed angularly spaced contacts on opposite sides of a vertical position contact and a moveable vertical seeking sensing means comprising a sensing member directly responsive to the influence of gravity as the motor is tilted and independent of the tilt or plane of the boat, said sensing member being engageable with said contact members as the propeller is tilted, each of said contact members being electrically connected to a separate indicator receiving means having a plurality of signal means corresponsing to said angularly spaced contacts for signalling the degree of tilt corresponding to the engagement of said vertical seeking sensing means with said angularly spaced contacts, said angularly spaced contacts being mounted on an arcuate track being separately engageable by said sensing member as the motor is tilted, and said sensing member is in the form of an electrically conductive metallic ball element freely moveable on said track when the motor is tilted.

2. The trim indicator of claim 1 in which said indicator receiving means has means for mounting in the boat at a remote position from the indicator and is electrically connected to said indicator by separate electrical leads to each of said angularly spaced contacts.

3. The trim indicator of claim 2 in which said signal means comprises separate lights indicating various degrees of tilt and a vertical trim position.

4. The trim indicator of claim 1 in which said track has a ground contact spaced from said angularly spaced contacts and said sensing member is electrically conductive and completes a circuit when moved into contact with an angularly spaced contact to a separate signal means in said receiving means to indicate the angular degree of tilt.

5. The trim indicator of claim 4 in which a first side of said track is comprised of said angularly spaced contacts and a second side is comprised of an extended ground contact extending opposite each of said contacts.

6. The trim indicator of claim 5 in which an arcuate member is spaced closely above said sensing member to dampen any bouncing tendency caused by turbulence forces.

7. The trim indicator of claim 5 in which said ball element has a diamater slightly greater than the spacing between the first and second side of said track and rides upon top edges of said sides.

8. The trim indicator of claim 7 in which an arcuate cover member is spaced closely above said sensing member to dampen any bouncing tendency caused by turbulence forces.

9. The trim indicator of claim 6 in which a dampening fluid encloses the sensing member to minimize any bouncing tendency caused by turbulence forces.

10. The trim indicator of claim 7 in which a dampening fluid encloses the sensing member to minimize any bouncing tendency caused by turbulence forces.

11. The trim indicator of claim 7 in which an arcuate cover member is spaced closely above said sensing member to dampen any bouncing tendency caused by turbulence forces and a dampening fluid substantially fills a space bounded by said track sides and said cover and encloses the sensing member to minimize any bouncing tendency caused by turbulence forces.

12. In a boat having an outboard motor propeller the improvement comprising trim indicator to indicate the tilt angularity of the motor propeller with respect to the vertical as an aid in maintaining the axis of the propeller parallel to the surface of the water and perpendicular to the vertical, said indicator comprising means for mounting the indicator on the motor in a fixed position with respect to the propeller to provide for a corresponding tilting movement of the indicator as the propeller is tilted, said indicator comprising a tilt indicator sending housing supporting a vertical seeking means in moveable relation with said housing, said sensing means comprising a sensing member directly responsive to the influence of gravity as the motor is tilted and independent of the tilt or plane of the boat, a plurality of separate electrical circuit means separately energizable by said sensing means responsive to different degrees of tilt, each of said separate circuit means being electrically connected to an indicator receiving means having a plurality of separate circuit means for signalling the degree of tilt of said motor.

13. The trim indicator of claim 12 in which said indicator receiving means has means for mounting in the boat at a remote position from the indicator and is electrically connected to said indicator by separate electrical leads to each of said separate circuit means.

* * * * *